United States Patent

Maulsby

[15] 3,649,870

[45] Mar. 14, 1972

[54] PINCUSHION CORRECTION CIRCUIT UTILIZING A DC-REGULATED POWER SUPPLY

[72] Inventor: William W. Maulsby, Chicago, Ill.

[73] Assignee: Zenith Radio Corporation, Chicago, Ill.

[22] Filed: May 1, 1970

[21] Appl. No.: 33,765

[52] U.S. Cl. ....................315/27 GD, 315/29

[51] Int. Cl. ....................H01j 29/70

[58] Field of Search ....................315/27 GD, 27 TD, 27, 28, 29, 315/18

[56] References Cited

UNITED STATES PATENTS

| | | | |
|---|---|---|---|
| 3,447,027 | 5/1969 | Kramer | 315/27 GD |
| 3,412,281 | 11/1968 | Richards et al. | 315/22 |
| 3,571,653 | 3/1971 | Hansen et al | 315/27 GD |

*Primary Examiner*—Carl D. Quarforth
*Assistant Examiner*—J. M. Potenza
*Attorney*—Francis W. Crotty and Cornelius J. O'Connor

[57] ABSTRACT

A circuit for correcting side pincushion distortion in a color television receiver having a cathode-ray tube and associated horizontal and vertical deflection circuits for generating a raster thereon. The circuit comprises a power supply for developing a DC potential and a regulating circuit for the supply which includes a transistor device, the collector-emitter path of which is serially interposed between the output of the supply and the energizing electrode of an output transistor in the horizontal deflection circuit. An integrating network, coupled to the vertical deflection circuit, derives a parabolic wave signal which is applied to the DC potential translated by the regulating transistor. The parabola-modulated DC potential applied to the energizing electrode of the horizontal output transistor changes the magnitude of horizontal scanning current in the horizontal deflection circuit parabolically as the electron beams are vertically deflected from the top of the raster to the bottom.

5 Claims, 3 Drawing Figures

Inventor
William W. Maulsby
By Cornelius J. O'Connor
Attorney

PINCUSHION CORRECTION CIRCUIT UTILIZING A DC-REGULATED POWER SUPPLY

BACKGROUND OF THE INVENTION

This invention relates in general to circuitry for correcting distortion in the raster of a television receiver and in particular to a circuit for correcting pincushion distortion in the sides of the raster.

Basically, pincushion distortion is attributable to the fact that the radius of curvature of the cathode-ray tube face plate is different than the radius of the scanning beam, as measured from its center of deflection. Another contributing factor to pincushion distortion is the use of a tilted electron beam gun assembly, a conventional practice. Such a gun assembly, by virtue of its construction, affects the angle at which the beams pass through the deflection yoke. Geometry considerations of the yoke itself must also be considered, as well as the fact that the effective origin of the blue electron beam is vertically displaced from the central axis of the tube a greater distance than the effective origins of the red and green electron beams. These factors collectively produce an aberration of the reproduced image which is manifested by a bowing in at the top, bottom and sides of the raster, in other words, pincushion distortion.

In a monochrome television receiver, pincushion distortion can be corrected by selectively positioning permanent magnets about the periphery of the cathode-ray tube envelope so that the fields of the magnets exert a compensating deflection on the beam. In a color television receiver, however, such a magnet arrangement cannot be utilized as it would adversely affect purity of the reproduced image.

A particularly attractive arrangement for correcting top and bottom pincushion distortion features a saturable reactor device, which arrangement is disclosed and claimed by Raymond C. Figlewicz in his patent application Ser. No. 833,421, which was filed on June 16, 1969 and is assigned to the same assignee as the subject invention. The present invention, on the other hand, is specifically addressed to correction of side pincushion distortion.

In addition to saturable reactors, which are also used for correcting side pincushion distortion in television receivers, the prior art also teaches the technique of modulating the horizontal scanning current in one manner or other to compensate for side pincushion. For example, it is known to apply a modulating control signal to the control electrode (grid or base) of a horizontal output device, or to an output electrode (anode or collector) of such a device in order to vary the amplitude of scanning current in accordance with the modulating signal. While some of these approaches have resolved some aspects of side pincushion distortion, they are characterized by needlessly complex and inefficient circuitry that penalizes the receiver from an economic standpoint.

OBJECTS AND SUMMARY OF THE INVENTION

It is therefore an object of the invention to provide an improved circuit for correcting side pincushion distortion in a television receiver.

It is a particular object of the invention to provide a horizontal pincushion correction circuit which affords economies over the prior art practice.

It is still another object of the invention to provide a new and improved circuit for correcting side pincushion distortion in a television receiver of the type having a regulated DC power supply.

A circuit is provided in accordance with the invention for correcting side pincushion distortion in a television receiver comprising a cathode-ray tube that includes electron beam forming and directing means, a horizontal deflection circuit including an electron control device having an energizing electrode and a vertical deflection circuit. The deflection circuits conjointly deflect the beam in mutually perpendicular directions to generate a two-dimension raster. The correction circuit comprises a power supply for developing a unidirectional potential for energizing the horizontal deflection circuit and a control circuit for maintaining the output of the power supply substantially constant. The control circuit comprises a regulating electron control device for translating the unidirectional potential and it has an input electrode connected to the output of the supply, a control electrode and an output electrode. The control circuit also includes an error-responsive electron control device for monitoring the output potential of the regulating device. This error-responsive device has an input terminal connected to the output electrode of the regulating device, an output terminal coupled to the control electrode of the regulating device, and a third or common terminal. A wave-shaping circuit is coupled to the vertical deflection circuit for deriving therefrom a parabolic wave signal varying at the vertical deflection frequency. Means are provided for coupling this parabolic signal to the input terminal of the error-responsive device in order to apply a parabolic component to the unidirectional potential translated by the regulating device. Finally, means are provided for applying the parabola-modulated unidirectional potential to the energizing electrode of the electron control device included in the horizontal deflection circuit in order to change the magnitude of horizontal scanning current in that circuit parabolically as the beam is vertically deflected from the top of the raster to the bottom.

DESCRIPTION OF THE PREFERRED EMBODIMENT

Figure 1:
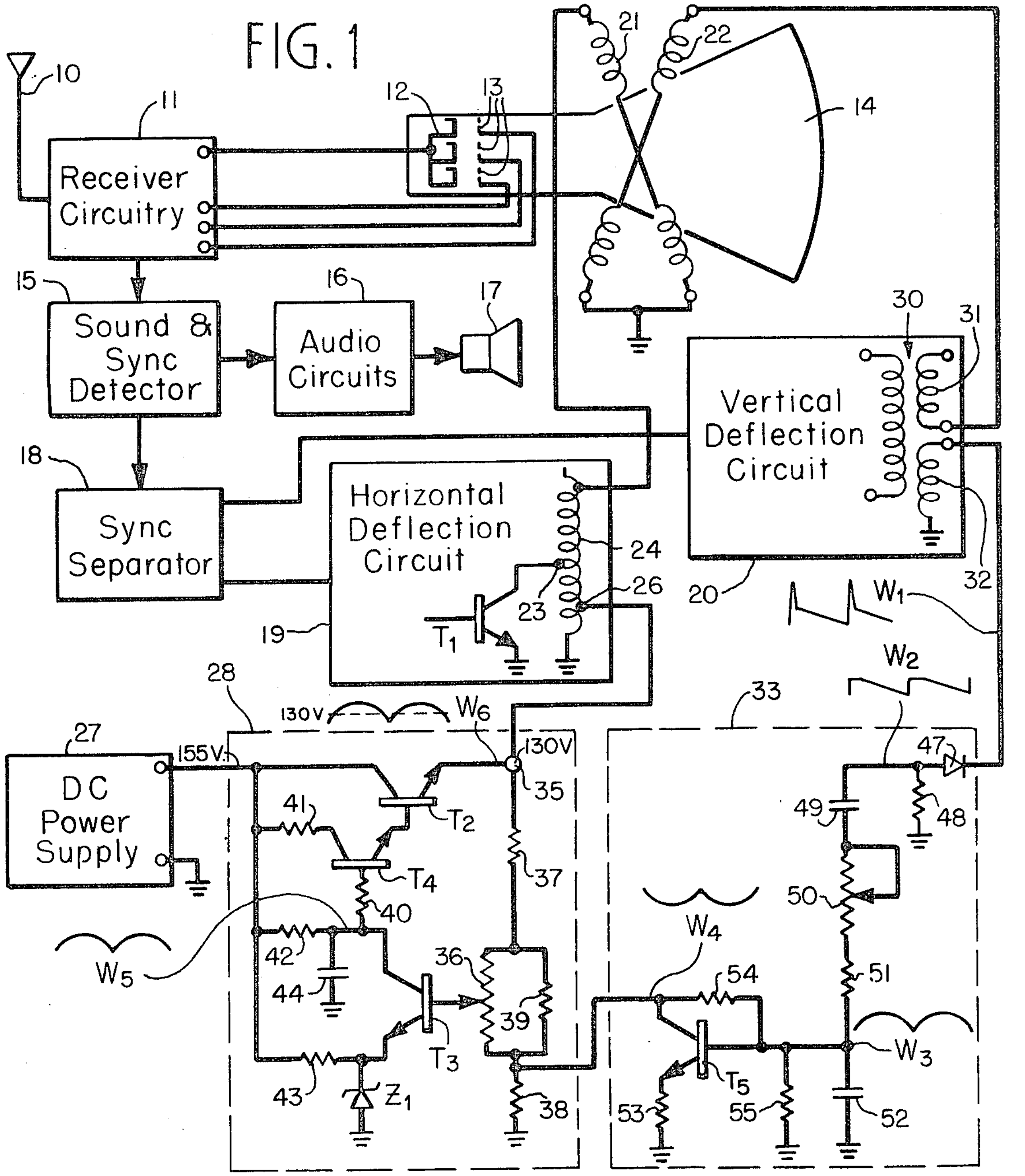
FIG. 1 is a schematic representation, partially in block diagram form, of a color television receiver embodying a pincushion correcting circuit constructed in accordance with the invention.

Except for a side pincushion correction circuit associated with a regulated DC power supply and the deflection circuitry, the television receiver depicted in FIG. 1 is conventional in design and therefore only a brief description of its structure and operation is deemed necessary. A received signal intercepted by antenna 10 is coupled to television receiving circuits 11 which include the usual signal translating, heterodyning and IF amplifier circuits for deriving a composite video signal from the received television transmission. Circuits 11 also include luminance and chrominance signal processing circuits for supplying luminance and chrominance signals, respectively, to the cathodes 12 and control electrodes 13 of the beam forming and directing means included in the neck portion of a color reproducing cathode ray tube 14 for developing a trio of scanning electron beams.

The output of the IF amplifier included in receiver circuits 11 is applied to a sound and sync detector 15 which develops a video signal that includes both sound and synchronizing components. The sound components are applied to audio circuits 16 wherein conventional sound demodulation and amplification circuitry develops an audio output signal suitable for driving a loud speaker 17.

Figure 2:
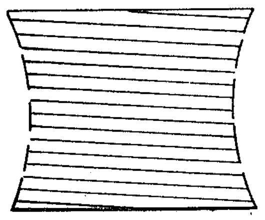
FIG. 2 is an illustration of a side pincushion distortion in a television scanning raster.

Synchronizing signals, in the form of horizontal and vertical sync pulses are derived from the output signal of detector 15 by a sync signal separator 18 and applied to horizontal and vertical deflection systems 19, 20 respectively, which systems utilize these pulses to generate horizontal and vertical sawtooth scanning currents to drive respective deflection coils 21, 22 positioned adjacent the funnel portion of cathode-ray tube 14. Energized in this fashion, coils 21, 22 deflect the electron beams in mutually perpendicular directions to generate a two-dimensional raster. A raster generated in this fashion, but afflicted with side pincushion distortion, is shown in FIG. 2.

Only so much of the horizontal and vertical deflection circuits as are required to illustrate the invention have been shown. Accordingly, the horizontal deflection circuit 19 includes an electron control device in the form of an NPN-transistor $T_1$ which has an input or base electrode, an emitter which is maintained at reference potential and a collector or energizing electrode which is connected to a tap 23 on the horizontal output transformer 24. The horizontal deflection coil 21 is driven by output transformer 24 which further includes an input tap or connection 26 that is returned to a source 27 of unidirectional potential via a control or voltage regulator circuit 28. It is power supply 27 that serves to energize horizontal output transistor $T_1$. The vertical deflection circuit also includes an output transformer 30 having a first winding 31 for driving the vertical deflection coil 22 and a second winding 32 that furnishes a vertical rate signal to a wave-shaping circuit 33.

Power supply 27 may comprise a conventional rectifier bridge circuit for developing and applying a DC potential to its control circuit 28, which circuit maintains the output of supply 27 substantially constant irrespective of fluctuations in the input voltage to the supply or in the load driven by the supply. Control circuit 28 comprises an NPN-transistor $T_2$ that serves as a series regulating device for translating the unidirectional output potential of power supply 27. Transistor $T_2$ has a collector, or input electrode, which is connected to the output of supply 27, a control or base electrode, and an emitter or output electrode which is connected to an output terminal 35. An error-responsive electron control device in the form of an NPN-transistor $T_3$ is employed to monitor the output voltage of transistor $T_2$ and to this end has its base connected to the emitter or regulator $T_2$ through a potentiometer 36 and a fixed resistor 37. The lower terminal of control 36 is returned to ground through a resistor 38 while another resistor 39 is shunted across the control. The emitter of transistor $T_3$ is returned to ground through a zener diode $Z_1$ which serves to maintain the emitter of $T_3$ at a fixed DC potential. The collector of $T_3$ is coupled to the base of series regulator $T_2$ through a resistor 40 and the base-emitter path of a current-amplifying NPN-transistor $T_4$. A biasing arrangement for the several transistors in control circuit 28 includes the voltage dropping resistor 41 which connects the collector of transistor $T_4$ to the output of the power supply, another voltage dropping resistor 42 which is connected between the power supply and the collector of transistor $T_3$ and, finally, a resistor 43 which connects the supply to the junction of the zener diode and the emitter $T_3$. A bypass capacitor 44 establishes the collector of transistor $T_3$ at RF ground potential.

Waveshaping circuit 33, which is coupled to vertical deflection circuit 20 in order to derive a parabolic wave signal therefrom, comprises a diode 47 and a resistor 48 which are serially connected between an output terminal of winding 32 and ground. The juncture of diode 47 and resistor 48 is coupled via capacitor 49 to an integrating network which includes, a potentiometer 50, a fixed resistor 51 and a capacitor 52. The juncture of resistor 51 and capacitor 52 is connected to the input or base of a phase-inverting and amplifying NPN-transistor $T_5$ which has its emitter returned to ground through a resistor 53 and its collector connected to the juncture of resistors 38 and 39 in the regulator circuit. A pair of resistors 54, 55, having their juncture connected to the base of transistor $T_5$, are serially connected between the collector of $T_5$ and ground to provide base bias for $T_5$.

Insofar as the operation of the disclosed pincushion correction circuit is concerned, the manner in which regulator circuit 28 functions will first be considered. As seen in FIG. 1, the emitter collector path of regulating transistor $T_2$ is serially interposed between the output terminal of power supply 27 and the energizing electrode of the horizontal output transistor $T_1$. The output of regulator circuit 28 is monitored by a feedback path that includes resistors 36 and 37 and the base-emitter circuit of transistor $T_3$. Assuming for the moment that the desired output potential at terminal 35 is 130 volts DC, then should that potential drop, the DC voltage at the base of transistor $T_3$ will also drop. Since the emitter of $T_3$ is held at +24 v. by zener diode $Z_1$, a drop in base voltage reduces the collector current in transistor $T_3$ with the result that the collector potential of $T_3$ rises. This rise in collector potential is communicated to the base of amplifier $T_4$ through resistor 40 so that the emitter current of $T_4$ increases. Since the emitter of $T_4$ is directly connected to the base of regulator $T_2$ the base current of $T_2$ also increases thereby reducing the resistance in the emitter-collector path of the regulating transistor. As regulator $T_2$ is rendered more conductive the voltage drop across its emitter-collector path decreases and the output voltage at terminal 35 rises to offset the drop that initiated the regulating action. Thus any change in input voltage to power supply 27 or change in the load served by the output of regulator 28 will be restored by virtue of the described regulating action.

By the same token, should the potential at terminal 35 rise the accompanying rise in DC potential at the base of transistor $T_3$ will render that transistor more conductive so that its collector voltage will decrease. Since the voltage on the base of transistor amplifier $T_4$ follows this change, the emitter current through $T_4$ will decrease thereby reducing the base current in regulator transistor $T_3$. In this circumstance, the resistance represented by the emitter-collector path of transistor $T_2$ increases, and the voltage drop across the collector-emitter path of $T_2$ also increases thus reducing the voltage at terminal 35. Insofar as selecting a desired operating DC potential at terminal 35, that is the function of potentiometer 36 since it establishes the DC bias on the base of transistor $T_3$ thereby determining its operating threshold.

Turning now to a consideration of wave-shaping circuit 33, waveform $W_1$ depicts the signal extracted from the vertical deflection circuit to be converted into the modulating signal for application to the DC output potential of regulator 28. More particularly, and with reference to the waveforms shown in FIG. 1, the spikes present in waveform $W_1$ are clipped by diode 47 to provide the sawtooth waveform $W_2$ across resistor 48. Waveform $W_2$ is coupled via capacitor 49 to integrating network 50, 51, 52. The integrating action of this network upon the sawtooth signal produces a substantially parabolic waveform $W_3$ across capacitor 52, which signal is applied to the base of transistor $T_5$. It is the function of adjustable resistor 50 to establish the amplitude of parabolic waveform presented to $T_5$. Transistor $T_5$ serves to amplify as well as phase invert the parabola applied to its base so that an inverted parabola $W_4$ is developed at its collector. $W_4$ is then applied across resistor 38 in the base circuit of transistor $T_3$. The phase of parabola $W_4$ applied to the base of $T_3$ is again inverted so that a parabola having the waveform $W_5$ is derived in the collector circuit of $T_3$. This parabola is translated by current amplifier $T_4$ without phase inversion, since it is operated as an emitter follower amplifier and applied to the base of $T_2$. As a result the DC potential translated by $T_2$ is now amplitude modulated by a parabola to produce an energizing DC potential having a waveform $W_6$ for application to the collector of horizontal output transistor $T_1$.

A DC operating potential modulated in this fashion causes the amplitude of the horizontal scanning current to vary parabolically. This is schematically illustrated in FIG. 3 wherein S denotes the peak of the horizontal scanning current at the start of the vertical sweep, C denotes the peak of the scanning current midway through the vertical sweep and F denotes the amplitude of the scanning current at or near the finish of the vertical sweep.

Figure 3:
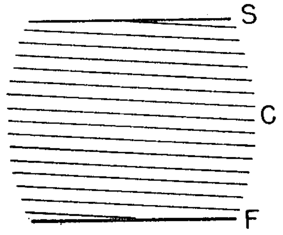
FIG. 3 depicts a parabolically modulated horizontal deflection current waveform for effecting side pincushion correction in a television scanning raster.

Now, referring back to FIG. 2 in the light of the above discussion of FIG. 3 it can be seen that modulating the DC energizing potential of the horizontal output transistor with a parabolic waveform varying at the vertical deflection rate will cause the horizontal sweep current to vary in like parabolic fashion, so that as the electron beams are swept vertically to develop a raster, the sides of the raster are expanded to compensate for side pincushion distortion.

A pincushion correction circuit constructed in accordance with the schematic diagram of FIG. 1 has been found to give very satisfactory performance; merely by way of illustration and in no sense by way of limitation, some of the circuit parameters for that pincushion correction circuit are as follows:

| | |
|---|---|
| power supply 27 output | 155 volts |
| terminal 35 | 130 volts |
| transistor $T_1$ | Delco DTS 804 |
| transistor $T_2$ | Delco DTS 410 |
| transistor $T_3$ | Motorola MPS–UO4 |
| transistor $T_4$ | Motorola MJE 340 |
| transistor $T_5$ | 2N5089 |
| diode 47 | 1N4383 |
| zener diode $Z_1$ | 1N5252 |
| potentiometer 36 | 30,000 ohms |
| resistor 37 | 56,000 ohms |
| resistor 38 | 12,000 ohms |
| resistor 39 | 6,800 ohms |
| resistor 40 | 12,000 ohms |
| resistor 41 | 22 ohms |
| resistor 42 | 22,000 ohms |
| resistor 43 | 470,000 ohms |
| capacitor 44 | 0.0015 mfd. |
| resistor 48 | 120,000 ohms |
| capacitor 49 | 0.047 mfd. |
| potentiometer 50 | 3,000,000 ohms |
| resistor 51 | 1,000,000 ohms |
| capacitor 52 | 0.033 mfd. |
| resistor 53 | 4,700 ohms |
| resistor 54 | 4,700,000 ohms |
| resistor 55 | 470,000 ohms |

In summary, the invention provides a side pincushion correcting circuit for a television receiver of the type comprising a voltage-regulated power supply, in which the voltage regulating system additionally serves to provide essential processing of the parabolic-wave compensating signal.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a television receiver comprising a cathode-ray tube which includes electron beam forming and directing means, a horizontal deflection circuit including an electron control device having an energizing electrode and a vertical deflection circuit, said deflection circuits conjointly deflecting said beam in mutually perpendicular directions to generate a two-dimension raster, a circuit for correcting pincushion distortion in the sides of said raster comprising:

a power supply for generating a direct current potential for energizing said horizontal deflection circuit;

a control circuit for maintaining the output of said power supply substantially constant, said control circuit comprising a regulating electron control device for translating said direct current potential and having an input electrode connected to the output of said power supply, a control electrode and an output electrode, and an error-responsive electron control device for monitoring the direct current potential translated by said regulating device, said error-responsive control device having an input terminal connected to said output electrode of said regulating device, an output terminal coupled to said control electrode of said regulating device and a third terminal;

a waveshaping circuit coupled to said vertical deflection circuit for deriving therefrom a parabolic wave signal varying at the vertical deflection frequency;

means for coupling said wave-shaping circuit to said input terminal of said error-responsive control device to apply said parabolic signal to said control electrode of said regulating device to modulate said direct current potential translated by said regulating device;

and means coupled to said output electrode of said control device for applying said parabola-modulated direct current potential to said energizing electrode of said electron control device included in said horizontal deflection circuit for changing the magnitude of horizontal scanning current in said horizontal deflection circuit parabolically as said beam is vertically deflected from the top of said raster to the bottom.

2. A pincushion-correcting circuit as set forth in claim 1 in which all said electron control devices comprise transistors.

3. A pincushion-correcting circuit as set forth in claim 1 in which said waveshaping circuit includes an integrating network for deriving said parabolic wave signal.

4. A pincushion-correcting circuit as set forth in claim 1 in which said control circuit further includes means for maintaining said third terminal of said error-responsive device at a fixed reference potential.

5. A pincushion-correcting circuit as set forth in claim 2 in which the base, emitter and collector elements of said regulating transistor form the control, output and input electrodes, respectively, of said regulating transistor so that the emitter-collector path of said regulating transistor, in response to said parabolic signal applied to said base element, comprises an adjustable series impedance across which said direct current potential is translated.

* * * * *